United States Patent Office 3,647,604
Patented Mar. 7, 1972

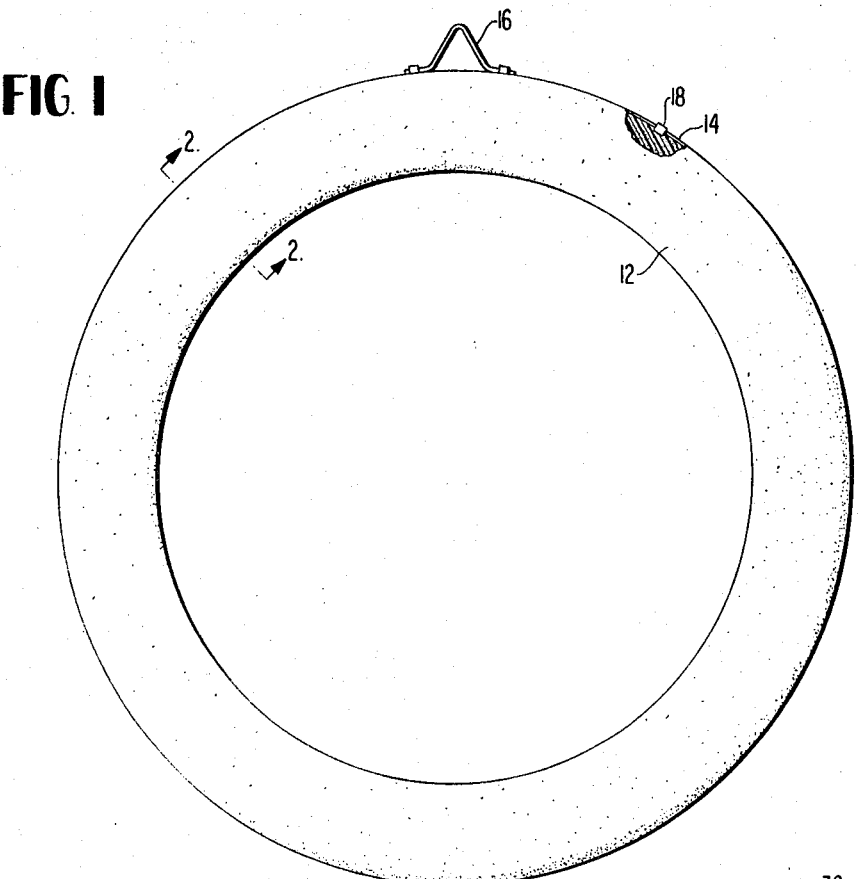
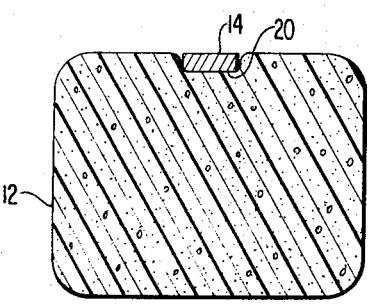
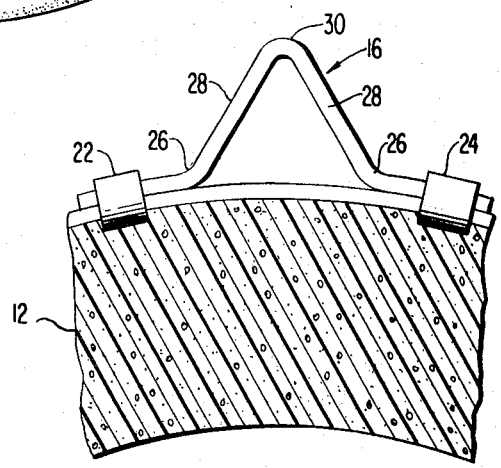

3,647,604
REINFORCED FOAMED PLASTIC WREATH RING
Leonard W. Schoenherr, Robert O. Schoenherr, and John W. Schmock, Ludington, Mich., assignors to Foliage Co. of America, Ludington, Mich.
Filed Nov. 4, 1969, Ser. No. 873,955
Int. Cl. A47g 33/08, 33/10
U.S. Cl. 161—15
8 Claims

ABSTRACT OF THE DISCLOSURE

This disclosure relates to a wreath ring comprising an annular ring formed of foamed plastic material reinforced with a metal band in compressive relationship thereto and positioned within an annular circumferential depression in the annular ring. A hook is formed in the shape of a loop with the ends thereof extending along the circumference of the annular ring and fixed to the metal band.

---

This invention relates to a foamed plastic wreath ring with reinforcing means. In one of its aspects, the invention relates to a wreath ring having an annular ring of foamed plastic material and a reinforcing band in compressive relationship thereto.

In another of its aspects, the invention relates to a wreath ring having an annular ring of foamed plastic material, a reinforcing member extending around said annular ring, and providing reinforcement therefor, and a hook fixed to the reinforcing member.

Wreath rings are used as a base for building Christmas wreaths from natural greens. The annular wreath rings have been made from a foamed polystyrene. The green pine boughs are fixed onto the plastic rings and thereafter supported on a wall or other suitable support. These wreath rings are quite satisfactory for the smaller wreaths. However, it has been found that for larger rings having a diameter in excess of about thirty inches, the weight of the pine boughs is too great for the low strength polystyrene. In addition, the rings are usually supported by wires which loop around the top of the rings creating a notch effect and still further weakening the polystyrene ring. Many of these larger wreaths are employed in commercial establishments. Many times the wreaths break and fall down shortly after they are suspended. This is not only embarrassing for the decorator, but is also hazardous.

We have now discovered an improved wreath ring having a novel reinforcing means which imparts strength and a supporting hook which does not weaken the existing structure.

By various aspects of this invention one or more of the following, or other, objects can be obtained.

It is an object of this invention to provide an improved wreath ring for larger wreaths with improved strength.

It is a further object of this invention to provide an improved wreath ring with a supporting hook which does not decrease the strength of the ring.

It is yet another object of this invention to provide an improved wreath ring in which the shape of the ring is maintained even for large and heavy wreaths.

It is yet another object of this invention to provide a wreath ring having a reinforcing member which is easily applied and fixed in place for permanent relationship to the annular ring.

It is still another object of this invention to provide a wreath ring with a hook free of high strength bends.

It is yet another object of this invention to provide a foamed plastic wreath ring, which maintains its shape and integrity, even though the ring itself may become broken through use.

Other aspects, objects, and the several advantages of this invention are apparent to one skilled in the art from a study of this disclosure, the drawings, and the appended claims.

According to the invention, there is provided a wreath ring for use as a supporting base in making a Christmas wreath. The wreath ring is formed from an annular ring of foamed plastic material and a circular reinforcing member extending around the annular ring and in reinforcing relationship thereto. A hook is fixed to the reinforcing member for supporting the wreath ring.

Preferably, the reinforcing member comprises an annular metal band surrounding the annular ring and in compressive relationship thereto.

The invention will now be described with reference to the accompanying drawings in which:

FIG. 1 is a front elevational view, partially in section, of a wreath ring according to the invention;

FIG. 2 is a sectional view taken along lines II—II of FIG. 1; and

FIG. 3 is an enlarged view in section of the hook employed in the wreath ring according to the invention.

Referring now to the drawings, there is shown an annular ring 12 of foamed plastic material such as commercially available foamed polystyrene commonly known in the industry under the trade name Styrofoam. A metal band 14 encircles the wreath ring at the outside diameter. A hook or fastening member 16 is fixed to the metal band 14.

The ends of the metal band 14 are secured together by a metal clip 18. The metal band is of conventional banding material made from metal such as steel and is preferably in the nature of ⅜ inch wide. The metal band 14 is in compressive relationship to the annular ring 12 and forms a circular depression 20 around the periphery of the annular ring 12. The compressive relationship strengthens the annular ring against breakage and maintains the shape and integrity of the ring in the event that the ring 12 becomes broken. The annular band further reinforces the annular ring. The depression 20 formed by the metal band 14 also retains the metal band in a predetermined position around the periphery of the annular ring 12. Thus, by the depression 20 and the compressive relationship of the metal band 14, the metal band is firmly fixed on the peripheral outside surface of the annular ring 12.

The hook or fastening member 16 is secured to the metal band 14 by metal clips 22 and 24. The fastening member 16 is made out of a similar or identical material and of equal width and thickness with the metal band 14. The fastening member 16 is bent in the form of a loop or bow and has rounded portions 26, straight portions 28 and a rounded top 30. The rounded portions 26 have a reverse curvature compared with the rounded top 30. The ends of the hook follow the circumference of the ring and these portions are fixed to the band 14. The fastening member 16 is preferably formed over a die or in a jig so as to prevent creasing at corners 26 and top 30. The rounded edges, provide for safer handling of the annular ring as well as provide for a stronger fastening member.

The metal clips 18, 22 and 24 are conventional clips used in securing metal bands together. These metal clips are installed conventionally by banding machines and form strong and secure joints for the ends of the band 14 and for affixing the fastening member 16 thereto.

The use of the metal band greatly enhances the durability of the foamed plastic wreath ring. In addition, the use of the band on the circumference of the ring provides a convenient place for fixing a hook so that the overall strength of the plastic ring is not affected. Further, the compressive relationship of the reinforcing band maintains the band within the circumferential depression in fixed relationship to the plastic ring, and also maintains the shape and integrity of the plastic ring. Even if the plastic ring breaks, the metal band holds the parts together and holds the ring in its original shape.

In the use of the invention, the wreath ring is used as a base for making Christmas wreaths. Green pine boughs are fixed onto and around the foamed ring. The wreath can then be supported by the hook 16.

Reasonable variation and modification are possible within the scope of the foregoing disclosure and drawings without departing from the spirit of the invention.

The embodiments of the invention in which an exclusive property or privilege is claimed are defined as follows:

1. A wreath ring for use as a base in making wreaths, said wreath ring comprising:
   an annular ring formed of a foamed plastic material, said ring having a circumferential depression about its outer surface; and
   a metal band positioned in said depression surrounding said ring and in compressive relationship thereto.

2. A wreath ring according to claim 1 further comprising a hook fixed to said metal band for supporting said wreath ring.

3. A wreath ring according to claim 2 wherein said hook is formed from a metal strap bent into the shape of a loop, the ends of said loop being fixed to said metal band.

4. A wreath ring according to claim 3 wherein said ends of said metal strap extend along the surface of said metal band following the circumference of said ring.

5. A wreath ring according to claim 4 wherein said loop is formed of smooth curves.

6. A wreath ring for use as a base in making wreaths, said wreath ring comprising:
   an annular ring formed of a foamed plastic material;
   a circular reinforcing member extending around the outer circumference of said annular ring in reinforcing relationship thereto; and
   a hook fixed to said reinforcing member for supporting said wreath ring.

7. A wreath ring according to claim 6 wherein said hook is formed from a metal strap bent in the form of a loop, said hook having ends which are fixed to said metal band.

8. A wreath ring according to claim 1 wherein said foamed material is foamed polystyrene.

References Cited

UNITED STATES PATENTS

| | | | |
|---|---|---|---|
| 3,533,890 | 10/1970 | Nesbit | 161—159 X |
| 2,473,855 | 6/1949 | Braun | 47—41.12 |
| 3,511,736 | 5/1970 | Nielsen, Jr., et al. | 161—15 |
| 2,645,872 | 7/1953 | Melander | 248—27.8 |
| 2,941,268 | 6/1960 | Morse | 24—735 |
| 2,915,891 | 12/1959 | Vealey | 24—735 |

PHILIP DIER, Primary Examiner

U.S. Cl. X.R.

24—73; 47—41.12; 161—31, 48, 109, 219, 159; 248—27.8